Dec. 23, 1952          H. W. GOODRICK          2,623,181
FLUORESCENT SCREEN
Filed Nov. 12, 1948
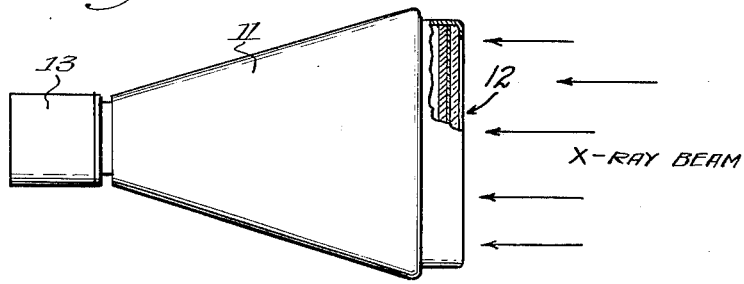
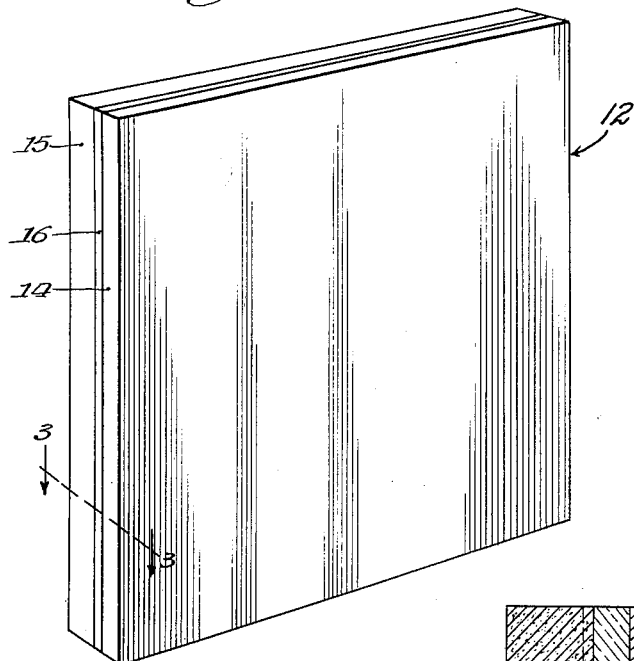
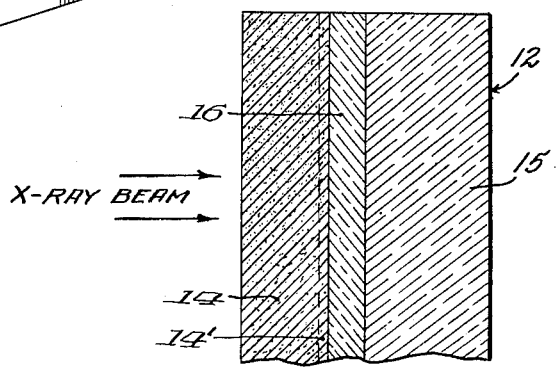
Inventor
Howard W. Goodrick
By: Spencer, Marzall, Johnston & Cook Patented Dec. 23, 1952

2,623,181

UNITED STATES PATENT OFFICE 2,623,181

FLUORESCENT SCREEN

Howard W. Goodrick, Greenfield, Wis., assignor to General Electric Company, a corporation of New York Application November 12, 1948, Serial No. 59,556

8 Claims. (Cl. 250—65)

1

The present invention relates in general to fluorescent screens, and has more particular reference to an improved screen particularly well adapted for use in photo-roentgenography and fluoroscopy.

Photo-roentgenography, that is to say, the making of photographic pictures of fluoroscopic shadow picture images induced in fluorescent screens, as by the impingement of X-rays thereon, has recently received attention in order to provide small, readily filable photographic record negatives in place of large sized direct X-ray negatives. Direct X-ray negatives, of course, are necessarily large enough to carry a full size picture of the X-rayed part, such, for example, as the chest portions of a human being, such negatives commonly being of the order of 300 square inches in area, and, in large numbers, presenting an exceedingly difficult and costly record filing problem. Accordingly, pictures for record purposes are presently made by X-raying the part to be pictured to produce a shadow X-ray image on a fluorescent screen, and then, with a suitable camera, photographing the image on a relatively small size negative, having area of the order of less than 20 square inches, in the manner described in U. S. patent to Glenn W. Files No. 2,332,375, of October 19, 1943.

The fluorescent screen so employed commonly comprises a layer of cardboard, plastic, or other suitable panel material, in which is uniformly distributed a suitable fluorescent material, such as zinc calcium sulphide, or calcium tungstate, as by coating the fluorescent material as a uniform layer on the surface of a cardboard sheet, or by incorporating the fluorescent material uniformly throughout a plastic layer. Impingement of X-rays from a suitable source, and directed through an object to be pictured, will act upon the fluorescent material or layer in the screen to reproduce thereon a shadow picture corresponding with the X-rayed object.

In photographing X-ray induced shadow pictures on a fluorescent screen, the quality of the resulting photographs depends, in large measure, upon the brightness, in terms of visible light, of the X-ray induced shadow picture on the screen, and it is an important object of the present invention to provide an improved fluorescent screen construction having the ability to induce shadow pictures of markedly improved brightness on the screen, in response to X-ray excitation thereof.

Another important object is to provide a fluorescent screen having improved image brightness characteristics by surfacing the screen with

2 a layer of material adapted to become visibly luminescent in response to ultra violet radiation, whereby, in a sense, to boost up the visible shadow picture image, induced on the screen by X-ray excitation, through utilization of the invisible short wave ultra violet radiation, forming a part of the X-ray induced shadow picture, to excite the layer of ultra violet light sensitive material, and thereby produce visible light rays in registration with the visible rays forming the shadow picture induced on the screen by X-ray excitation.

Another important object is to provide a fluorescent screen for X-ray purposes, comprising a layer of material adapted to become luminescent in response to X-ray excitation, and an adjacent, and preferably intimately contacting, layer of light transparent material adapted to become luminescent in response to ultra violet radiation.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a diagrammatic view of photo-roentgenographic apparatus embodying the present invention;

Fig. 2 is a perspective view of a fluorescent screen embodying the present invention; and Fig. 3 is an enlarged sectional view taken substantially along the line 3—3 in Fig. 2.

To illustrate the invention the drawings show photo-roentgenographic apparatus comprising a preferably light-tight box 11 of tapered, sleeve-like configuration, having a fluorescent screen 12 mounted in the larger end of the box, and a photographic camera 13, including a suitable lens, shutter, and film holder, mounted at the other end of the box, in position to photograph, on light sensitive film, in the camera, pictures of shadow images induced on the screen 12 in response to impingement thereon of X-rays from a source outwardly of the box 11 and on the side of the screen 12 remote from the camera 13.

Although shown in position assembled as a part of photo-roentgenographic equipment, it will be obvious that the screen 12 may be mounted, as in a suitable holder, for use as an X-ray excitable screen for fluoroscopic purposes, in which X-ray induced images on the screen are viewed directly by the eye of an observer.

The screen 12 comprises a fluorescent layer 14 of any suitable or preferred character. This layer may comprise cardboard impregnated or coated with material adapted to become luminescent when excited by X-rays. To this end, the layer 14 may be impregnated or coated with zinc calcium sulphite, calcium tungstate, or other fluorescent material susceptible of X-ray excitation. Where the fluorescent material is coated upon the layer 14, it is preferably applied on the surface of the layer which is to face the eye of the observer or the camera, as the case may be, as indicated at 14', and, if desired, both surfaces of the layer 14 may be coated with fluorescent material. Alternately, the layer 14 may comprise a panel of plastic material in which the luminescent substance is uniformly incorporated in the panel material, or coated on the surface thereof.

The screen 12 also may comprise a support layer 15 of light transparent material, such as glass, which may be lead glass if desired, in order to substantially prevent the passage of X-rays therethrough to the camera, or to the eye of an observer when the screen is used for fluoroscopic purposes.

The fluorescent layer 14 may, of course, be secured to the support panel 15 in any preferred fashion, and the screen is preferably mounted in position to receive X-rays upon the surface of the member 14 which faces away from the support member 15, the support member 15 extending between the fluorescent layer 14 and the eye of the observer or the camera, as the case may be. Where the layer 14 is provided with a surface coating of fluorescent material, as at 14', such coating should be applied on the surface of the layer 14 which faces toward the camera or the eye of the observer, that is to say, the surface of the layer 14 which faces away from the X-ray source.

When the luminescent material of the layer 14 is excited by X-ray impingement thereon, it becomes fluorescent and radiates not only visible light which may be observed and photographed, but also invisible ultra violet light of wave length of the order of 254 millimicrons. In order to improve the brightness of visible light radiation from the member 14 under X-ray excitation, a layer 16 is incorporated in the screen 12, preferably in intimate surface contact with the camera or observer facing fluorescent surface of said layer 14. The layer 16 preferably comprises a relatively thin, uniform layer of transparent material adapted to luminesce and radiate visible light when exposed to ultra violet radiations. To this end, the layer 16 preferably comprises glass containing tin or manganese, or both, as fluorescing agents under ultra violet excitation. Other materials capable of rendering the glass luminescent in response to ultra violet light excitation may, of course, be incorporated in the glass. The layer 16 may comprise a sheet of any suitable transparent material containing or coated with a layer of material adapted to become luminescent when excited by ultra violet light.

The layers 14, 15, and 16 may be secured together and integrated in any desired fashion to form the composite layered screen 12; and, if desired, of course the member 15 could be eliminated entirely if the layer 16 is made thick enough to provide adequate strength in the screen. The present invention contemplates screens having areas of the order of 300 square inches and more, and it is necessary that screens of such relatively large size have sufficient inherent strength to be self-supporting in operative position in suitable mounting frames, and to resist breakage in service. In this connection, it should be noted that, to obtain optimum resolving power and definition of the screen, the secondary fluorescing material in the layer 16 should be disposed in as thin a layer as possible.

By providing the member 16, it will be seen that substantially all of the light energy produced in the member 14 by X-ray excitation, including visible light as well as invisible ultra violet light, may be transmitted through the layer 16 to the eye of the observer or to the camera, and that in passing through the layer 16, the visible light will be intensified and boosted by conversion of the ultra violet light component in the layer 16, in registration with the corresponding visible component, so that the camera, or the observer, will receive total visible light comprising the aggregate of the visible light component emitted by the layer 14 and the invisible component converted to visible light in the layer 16.

In this manner, invisible ultra violet radiation from the layer 14 may be converted to visible light to enhance image brilliance for both fluoroscopy and photo-roentgenography. Although photographic film emulsions highly sensitive to ultra violet light, such light is largely absorbed in the lens structure of cameras used for photo-roentgenography, so that by converting the relatively short wave length ultra violet radiation of the layer 14 to light of longer wave length marked improvement in photographic pictures may be obtained.

The present invention is not limited to any particular material for converting ultra violet radiations to light of longer wave length. Any material which fluoresces when excited by short wave ultra violet light rays may be employed. For fluoroscopy, a material producing visible radiation of light having wave lengths of the order of 550 milli-microns, which is the wave length of maximum sensitivity of the normal human eye, is most suitable. For photo-roentgenography, material producing light radiation of somewhat shorter wave length is desirable to match maximum film sensitivity.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. X-ray apparatus comprising a screen mounting and a screen supported in said mounting in position presenting a surface of said screen toward a source of X-rays, said screen comprising a layer of X-ray sensitive material excitable by X-ray impingement to produce visible and invisible light rays and to project the same in a direction away from said X-ray source, a layer of transparent material disposed in the path of said visible and invisible light rays and comprising material adapted to be energized by said invisible rays for the production of visible light, whereby visible light produced by X-ray excitation may be transmitted through said transparent layer and augmented by visible rays produced in the transparent layer by impingement thereon of invisible rays, and a panel of material transparent to visible light rays and substantially opaque to X-rays disposed in said mounting on the side of said layer of X-ray excitable material remote from said source of X-rays.

2. X-ray apparatus as set forth in claim 1, wherein said screen comprises a panel carrying a coated layer of said X-ray sensitive material upon a surface thereof facing the layer of transparent material.

3. X-ray apparatus as set forth in claim 1, wherein said screen comprises a panel of porous material impregnated with said X-ray sensitive material in fashion presenting the same as a layer on the surface of said panel which faces toward the layer of transparent material.

4. X-ray apparatus as set forth in claim 1, wherein said X-ray sensitive material comprises calcium tungstate.

5. X-ray apparatus as set forth in claim 1, wherein said X-ray sensitive material comprises zinc calcium sulphide.

6. X-ray apparatus as set forth in claim 1, wherein said layer of transparent material carries tin uniformly distributed throughout the area thereof as material adapted to be energized by invisible rays for the production of visible light.

7. X-ray apparatus as set forth in claim 1, wherein said layer of transparent material carries manganese uniformly distributed throughout the area thereof as material adapted to be energized by invisible rays for the production of visible light.

8. X-ray apparatus comprising a screen mounting and a screen supported in said mounting in position presenting a surface of said screen toward a source of X-rays, said screen comprising a layer of X-ray sensitive material excitable by X-ray impingement to produce visible and invisible light rays and to project the same in a direction away from said X-ray source, a layer of transparent material disposed in the path of said visible and invisible light rays and comprising material adapted to be energized by said invisible rays for the production of visible light, whereby visible light produced by X-ray excitation of said X-ray excitable material may be transmitted through said transparent layer and augmented by visible rays produced in the transparent layer by impingement thereon of invisible rays emitted by said layer of X-ray excitable material under X-ray excitation, and camera means, including means for supporting photo-sensitive material in the path of said augmented rays.

HOWARD W. GOODRICK.

REFERENCES CITED

The following references are of record in the file of this patent:

UNITED STATES PATENTS

| Number | Name | Date |
| --- | --- | --- |
| 1,394,296 | Fisher | Oct. 18, 1921 |
| 2,049,765 | Fischer | Aug. 4, 1936 |
| 2,088,595 | Hartmann | Aug. 3, 1937 |
| 2,116,633 | Long | May 10, 1938 |
| 2,298,947 | Leverenz | Oct. 13, 1942 |
| 2,355,258 | Biggs et al. | Aug. 8, 1944 |
| 2,433,129 | Land | Dec. 23, 1947 |
| 2,452,522 | Leverenz | Oct. 26, 1948 |
| 2,452,523 | Leverenz | Oct. 26, 1948 |